March 26, 1963    C. E. SCHWAB    3,083,361
RADAR TESTING APPARATUS
Filed July 28, 1955    2 Sheets-Sheet 1

United States Patent Office 3,083,361
Patented Mar. 26, 1963

3,083,361
RADAR TESTING APPARATUS
Carl E. Schwab, Flushing, N.Y., assignor to Hazeltine Research, Inc., Chicago, Ill., a corporation of Illinois
Filed July 28, 1955, Ser. No. 525,043
2 Claims. (Cl. 343—17.7)

General

This invention relates to apparatus for testing the overall performance of a radar system and, while it is of general application, it is particularly useful in testing the recovery characteristic of the receiver associated with the radar system subsequent to the moment when a radar pulse is transmitted.

In a radar system it is always desirable to know that the system as a whole is functioning properly. This is especially important in many situations where improper operation of the system may result in the loss of rather expensive equipment which is relaying on such radar system for its proper guidance or operation. It is also desirable to have means for checking the operating condition of a radar system which may be readily and reliably utilized by unskilled operators.

In order to check the over-all performance of a radar system, it is necessary to decide on some basic characteristic of the system which is indicative of the over-all operating condition of the system. One such characteristic is the so-called "loop sensitivity" of the system. By "loop sensitivity" is meant the sensitivity of the signal path starting with the transmitter, continuing through reflection of the signal off of a distant target, and ending with a signal being supplied to the output terminals of the receiver of the radar system. The greater the sensitivity of this loop, the greater is the magnitude of the signal produced in the receiver output in response to a given magnitude of transmitted signal. This "loop sensitivity" is, of course, dependent on the distance of the target as well as atmospheric propagation conditions and, hence, to afford any indication of the operating condition of the radar system, this "loop sensitivity" must be specified for a standard target at a standard distance. When this is done, any departure of the magnitude of the receiver output from the proper value will indicate that some part of the radar system is not functioning properly.

Another basic characteristic of importance in connection with a radar system is the recovery characteristic of the receiver subsequent to the moment when a radar pulse is transmitted. If the receiver fails to recover its optimum sensitivity rapidly enough, then echo signals from nearby targets may be lost completely or else evaluated improperly. Thus, it would appear that knowledge of the recovery characteristic as well as the "loop sensitivity" of a radar system would afford sufficient complete information to enable the proper decision as to whether the radar system is functioning properly and, hence, prevent the loss of expensive equipment that may be controlled thereby.

It has been heretofore proposed to test these characteristics of a radar system by means of a resonant cavity or a resonant one-quarter wave-length transmission line which is coupled to the radar system at a point common to both the transmitter and receiver. Such devices are commonly referred to as "echo boxes" and each individual radar pulse transmitted by the transmitter of the radar system is supplied to the "echo box" and causes it to "ring" or, in other words, to undergo self-oscillation for a brief interval after the radar pulse is transmitted. These self-oscillations are, in turn, supplied back to the receiver of the system thereby to produce a signal at the output terminals of the receiver which is indicative of the "loop sensitivity" of the radar system. In effect, the echo box simulates a distant target or, more precisely, a standard target at a standard distance. Also, by adjusting the rate at which the self-oscillation within the "echo box" decays so that such rate of decay corresponds to the desired rate of recovery of the receiver, a signal of more or less constant amplitude is produced at the output of the receiver over the decay interval provided the receiver recovers at the desired rate. Departure of the peak amplitude of this output signal from the desired constant level indicates that the receiver units of the radar system are not recovering properly.

While it appears that such "echo boxes" may be utilized to indicate the over-all performance of the radar system, such "echo boxes" have several undesirable features which limit their use and reliability. In the first place, the "echo box" is a resonant circuit and must be tuned to the same frequency as the operating frequency of the transmitter. The matter is complicated because the resonant frequency of the echo box is subject to change because of temperature variations. Tuning adjustment of the "echo box" may be made by adjusting some physical dimensions thereof but such adjustments are time consuming and present an occasion for human errors to enter into the results. Also, the rate of decay of the self-oscillation of the "echo-box" is highly dependent on the Q of the "echo box." As is known, the Q of an "echo box" is rather unstable and quite subject to change as a result of temperature changes which affect the dimensions of the box as well as the contact characteristics of the metal spring fingers usually associated with the frequency-adjustment mechanism of the "echo box." As a result, considerable skill is necessary in both the design and operation of an "echo box" in order to obtain a reliable indication of the over-all performance of a radar system.

It is an object of the invention, therefore, to provide new and improved radar testing apparatus which avoids one or more of the foregoing limitations of such apparatus heretofore proposed.

It is another object of the invention to provide new and improved radar testing apparatus of relatively simple construction and having highly stable performance characteristics to enable checking of the over-all performance of a radar system.

It is a further object of the invention to provide new and improved radar testing apparatus which is not frequency sensitive and which requires no frequency adjustment thereof in order to check the over-all performance of a radar system.

In accordance with the invention, apparatus for testing the over-all performance of a radar system including a pulsed transmitter and a receiver, and especially for testing the recovery characteristic of the receiver subsequent to the moment when a radar pulse is transmitted, comprises a transmission line of length substantially greater than the operating wave length of the transmitter and responsive to a portion of each of the transmitted radar pulses for producing multiple signal reflections of successively decreasing amplitude which are supplied to the receiver for determining the operating condition thereof, the attenuation factor of the transmission line being such that the average rate of decrease in amplitude of the signal reflections produced by the line corresponds to the desired rate of recovery of the receiver after each radar pulse is transmitted. The apparatus also includes means for coupling the transmission line to the radar system at a point common to both the transmitter and the receiver.

For a better understanding of the present invention, together with other and further objects thereof, reference is had to the following description taken in connection with the accompanying drawings, and its scope will be pointed out in the appended claims.

Referring to the drawings.

*Description and Operation of Radar System*

Figure 1:
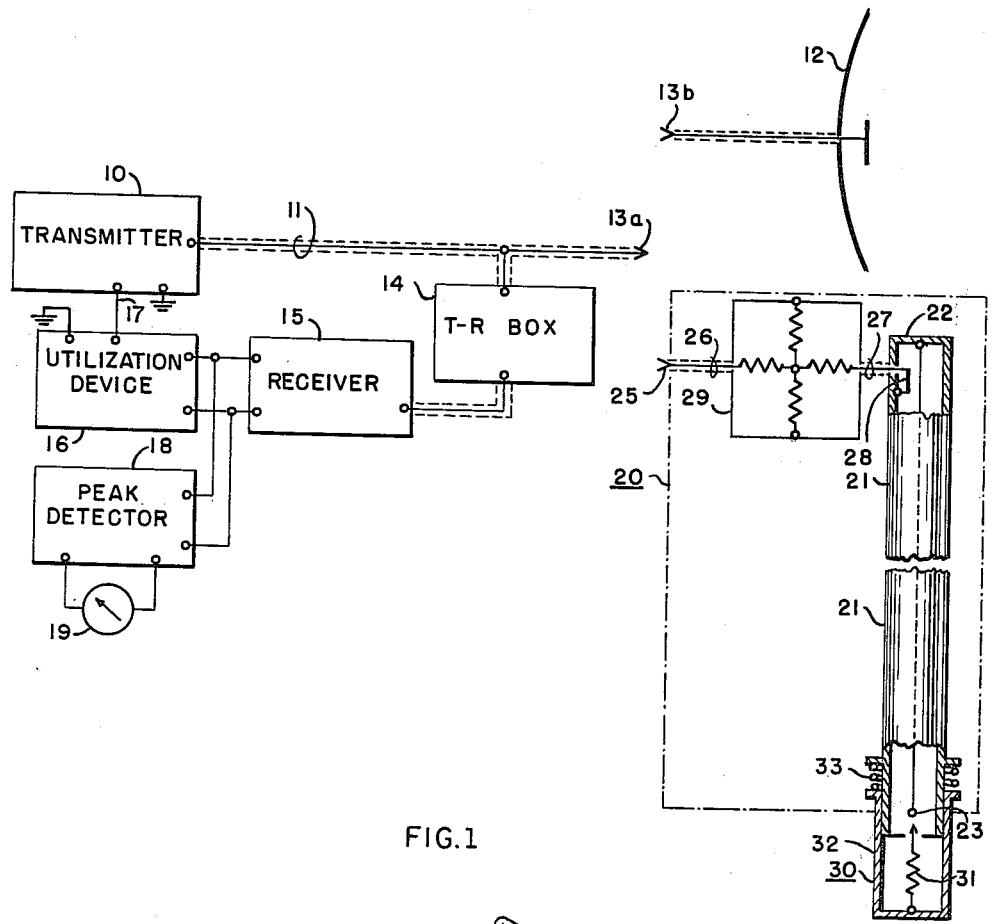
FIG. 1 is a circuit diagram, partly schematic, of a complete radar system and radar testing apparatus constructed in accordance with the present invention.

Referring to FIG. 1 of the drawings, there is shown a complete radar system and suitable radar testing apparatus constructed in accordance with the present invention for testing the radar system. Considering first the radar system, such system includes a transmitter 10, of conventional construction, for developing periodic pulses or bursts of radio-frequency energy which may be referred to as radar pulses. The transmitter 10 may include, for example, a suitable oscillator circuit or device, such as magnetron, and suitable pulse circuitry for controlling the periodic operation thereof. During normal operation, the radar pulses produced by the transmitter 10 are supplied by way of a transmission line 11 to an antenna 12 which is effective to radiate these radar pulses towards distant targets. The solid line enclosed by two dashed lines on adjacent sides thereof, used to denote the transmission line 11, is intended to represent a coaxial cable type of transmission line, the outer dashed lines representing the outer conductor of the coaxial cable. It is, of course, not essential that the transmission line 11 be a coaxial cable and such transmission line may be of any other suitable type, for example, it may be of the wave-guide type. As shown in FIG. 1, the transmission line 11 may be connected to the antenna 12 by properly connecting a pair of couplers 13a and 13b.

A T.-R. (transmit-receive) box 14 is coupled to the transmission line 11 and also to a receiver 15. In this manner, one antenna may be utilized for both the transmitter and the receiver of the radar system. The T.-R. box 14 is of conventional construction and includes a cavity containing a gaseous discharge tube which rapidly ionizes in response to a high-energy transmitted radar pulse and thereby effectively presents a short-circuit to the transmission line 11 and, thus, protects the receiver 15 from damage or overloading due to the high-power radar pulses. After an individual radar pulse has been transmitted, the gaseous discharge tube of the T.-R. box 14 deionizes to readily enable transmission of weak target echo signals from the antenna 12 to the receiver 15. In this manner, during the intervals between transmission of radar pulses, the antenna 12 is effective to intercept echo signals from distant targets and these echo signals are, in turn, supplied by way of the T.-R. box 14 to the receiver 15, which may be of conventional construction.

Coupled to the output terminals of the receiver 15 is a suitable utilization device 16, the construction and form of which depend upon the particular purpose to which the radar system is being put. Where, for example, the radar system is being utilized for navigation purposes to determine the distance of distant targets, the utilization device 16 may be a suitable oscilloscope for properly displaying the target echoes to enable determination of the distance On the other hand, the radar system may be utilized aboard an aircraft or a guided missile for automatically controlling the direction of flight thereof, in which case the utilization device 16 may comprise suitable relays and control circuits for controlling the direction of flight of the aircraft in response to the received radar signals. Suitable synchronization signals may be supplied to the utilization device 16 from the transmitter 10 by way of a conductor 17.

There may also be coupled to the output of the receiver 15 a peak detector 18 and a meter 19 for indicating the peak amplitude of the video signal present at the output terminals of the receiver 15. Such a peak detector and meter are particularly useful in conjunction with the testing apparatus of the present invention. The necessity of their presence, however, depends on the nature of the utilization device 16 and, where such utilization device is of a type sufficient to cooperate with the testing apparatus of the present invention, the separate peak detector 18 and meter 19 may be omitted unless desired for some other purpose.

*Description of Radar Testing Apparatus*

Referring further to FIG. 1 of the drawings, there is shown apparatus 20 for testing the over-all performance of a radar system such as represented, for example, by units 10—19 of FIG. 1. The radar testing apparatus 20 comprises a transmission line 21 of length substantially greater than the operating wave length of the transmitter 10 and responsive to a portion of the transmitter signal for producing multiple signal reflections of successively decreasing amplitude which are supplied to the receiver 15 for determining the operating condition thereof. In practicing the invention, the transmission line 21 may be rather extensive in length, for example, its length may be 80 feet. It will be noted, however, that in the FIG. 1 drawing the transmission line 21 has been broken as indicated, and the middle portion thereof not shown, in order to simplify the drawing. The transmission line 21 may be of any conventional type suitable for the signal frequencies being dealt with and, depending on such signal frequencies, may be of any of the following types, namely, either a rectangular or a circular wave guide, a strip-above-ground-plane transmission line, a coaxial cable, or a suitable type of two-wire line. It has been found that for the 1000–3000 megacycle range that coaxial cable constitutes a particularly useful type of line for the transmission line 21. By way of example, the transmission line 21 of the FIG. 1 drawing has been shown in the form of a coaxial cable.

The length of transmission line 21 is preferably such that the time required for an electrical signal to travel from one end of the line to the other end is at least equal to one-half the duration of a radar pulse. This condition may be met by suitably selecting the length of the transmission line 21 and is, of course, dependent on the velocity of propagation characteristics of the particular type of transmission line that is used. Also, the parameters of the transmission line 21 are preferably such that the average rate of decrease in amplitude of the signal reflections produced by the transmission line 21 corresponds to the desired rate of recovery of the receiver units 14 and 15 of the radar system after each radar pulse is transmitted. In particular, the total round-trip signal attenuation that results from translation of a signal down the transmission line 21 and back again should be selected to produce this desired rate of decrease in signal amplitude. The total round-trip attenuation of the line 21 is also dependent on the length thereof and, hence, in determining the proper length for the transmission line 21, this requirement must be taken into consideration in addition to the requirement that the one-way transmission time be at least equal to one-half the duration of a radar pulse. Another way of saying it is that the attenuation per microsecond of delay factor of the transmission line 21 must be such that a selected length of the line will satisfy both of these requirements.

The two ends of the transmission line 21 are terminated in such a manner as to produce substantial impedance discontinuities for enabling the portion of the transmitter signal supplied to the transmission line 21 to be reflected back and forth along the transmission line 21. To this end, the end 22 of the transmission line 21 may be terminated in, for example, a short circuit while the other end 23 of the line 21 may be terminated in, for example, an open circuit. The purpose is to produce substantial reflection of the signal from either end of the transmission line 21 and any type of termination suitable for this purpose may be utilized.

Radar testing apparatus 20, constructed in accordance with the present invention, also includes means for coupling the transmission line 21 to the radar system at a point common to both the transmitter 10 and the receiver 15. By "common point" is meant a point, region, or location through which both signals from the transmitter 10 and signals to the receiver 15 must pass. Such a common point is represented by the point along the transmission line 11 at which the coupler 13a is located. The coupling means for the radar testing apparatus 20 includes means such as a coupler 25 for coupling a signal-translating path to the radar system. The coupling means may also include, for example, additional segments of transmission line 26 and 27, the segment 26 being connected to the coupler 25 and the further end of segment 27 being terminated by a reactance coupler 28 for coupling this signal-translating path to the transmission line 21 near one end of the line 21. The coupling means also preferably includes signal-attenuating means 29 inserted at an intermediate point along the signal-translating path represented by transmission-line segments 26 and 27 for minimizing the effect on the radar system of any impedance discontinuity caused by the reactance coupler 28. This signal attenuating means of attenuator 29 may be of a conventional type suitable for use with the type of transmission lines actually used and may have an attenuation value of, for example, 9 decibels. In some cases, it may be desirable not to utilize transmission-line segments 26 and 27 in which case one end of attenuator 29 may be connected directly to to the coupler 25 while the other end of attenuator 29 is connected directly to the reactance coupler 28.

Where the reactance coupler is coupled as shown in FIG. 1, the loop portion thereof should be positioned to coincide with a current node of the standing wave produced on the transmission line 21 in order to afford as broad a coupling band width as possible so that the coupler will be comparatively insensitive to the operating frequency. It is not critical, however, that the reactance coupler 28 should be coupled to the transmission line 21 precisely as shown in FIG. 1 of the drawings as such reactance coupler may, for example, also be coupled to the transmission line 21 by coupling in an endwise fashion through the end 22 of the transmission line 21. In such case, the short-circuit termination of the end 22 is not used and the center conductor of the line 21 is formed into a pickup loop so as to afford suitable electromagnetic coupling to the loop portion of the reactance coupler 28. Where the coupler 28 is coupled in this manner, the coupling arrangement resembles that of a piston attenuator. Sufficient mismatch or impedance discontinuity is maintained at the end 22 because of the highly reactive nature of the coupler. Other suitable coupling arrangements will be apparent to those skilled in the art. In any event, the coupler 28 should be of the reactive type, i.e., should have a minimum resistive component in order to prevent excessive attenuation of the signal being translated.

As shown in FIG. 1, the testing apparatus 20 is connected to the radar system by first disconnecting the radar antenna 12 and then directly connecting the coupler 25 of the testing apparatus to the coupler 13a of the radar system. This is one possible way of coupling the apparatus 20 to the radar system and is intended as being only representative. Another alternative is to leave the radar antenna 12 coupled to the radar system and to couple an auxiliary antenna to the coupler 25 of the testing apparatus 20 and then to position this auxiliary antenna adjacent the radar antenna 12 a predetermined fixed distance therefrom. In this manner, coupling between the testing apparatus 20 and the radar system proper is accomplished by way of the electromagnetic radiation passing between the main radar antenna 12 and the auxiliary antenna.

The testing apparatus 20 preferably also includes control means 30 capable of terminating one end of the transmission line 21 in a matched resistive load 31 for disabling production of multiple signal reflections over desired intervals to ascertain that the receiver 15 response is caused primarily by the multiple signal reflections and not by other extraneous signals to be discussed hereinafter. The control means 30 may take the form of a push button, the barrel 32 of which is designed to slide over the end of the transmission line 21. In this manner, the pressing of the push button engages the resistor 31 with end 23 to absorb any signal energy reaching the end 23 of the transmission line 21. The resistor 31 is normally maintained in a disengaged position from end 23 by means of a suitable spring 33 and accompanying retaining rings.

Figure 2:
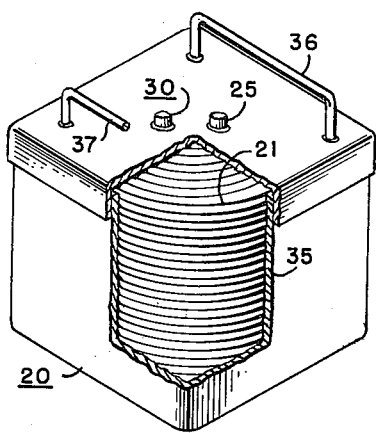
FIG. 2 is a partially sectional view showing a possible physical form of the radar testing apparatus of the present invention.

Referring now to FIG. 2 of the drawings, there is shown a possible physical form of the radar testing apparatus 20 of FIG. 1. Corresponding elements have been denoted by the same reference numerals in both figures. The structure of FIG. 2 is, of course, only representative but has been found to be useful where a length of ½ inch diameter coaxial cable of the order of 80 feet is used for the transmission line 21. Such a length of coaxial cable will produce a one-way transmission time of the order of 0.1 microsecond. The coaxial cable is suitably coiled as shown in FIG. 2. The over-all dimensions of the outer case 35 in which the testing apparatus is housed may be, for example, 12" x 12" x 8" and the total weight of the unit is of the order of 15 pounds. For ease of transporting the unit, carrying handles 36 and 37 may be affixed to the upper end of the case 35.

*Operation of Radar Testing Apparatus*

Considering now the operation of the radar testing apparatus just described, the apparatus 20 is connected to the radar system at a point common to both the transmitter and the receiver. More specifically, in the case of the FIG. 1 scheme, the radar antenna 12 is disconnected and the coupler 25 of the testing apparatus 20 is connected to the coupler 13a of the radar system. The radar system is operated in a normal manner and, hence, the periodic radar pulses developed by the transmitter 10 are supplied directly to the testing apparatus 20. Each radar pulse is translated by the segment of coaxial cable 26, the attenuator 29, and the coaxial cable segment 27 to the reactance coupler 28. The reactance coupler 28 is effective to couple a portion of each radar pulse to the reflection-producing transmission line 21. Because of the impedance discontinuity presented by the reactance coupler 28, a portion of each pulse is reflected back towards the radar system and is not coupled to the transmission line 21. Most of this initially reflected energy is absorbed by the attenuator 29 so that operation of the transmitter 10 is not adversely affected. The attenuator 29 is also effective to absorb an appreciable amount of the energy of each radar pulse during its initial passage through the attenuator 29 en route to the directional coupler 28. Thus, the portion of each radar pulse reaching the transmission line 21 is reduced in magnitude relative to the magnitude of such pulses when developed at the transmitter 10.

The portion of the radar pulse supplied to the transmission line 21 travels towards the far end 23 thereof and is thence reflected off of the open-circuit termination at this far end. Subsequently, the pulse energy travels back towards the short-circuit end 22 of the transmission line 21 and is then reflected off of this short-circuit end 22. Thus, the signal energy from each radar pulse is reflected back and forth along the transmission line 21 several times. However, each time the pulse signal passes the reactance coupler 28, a portion of such signal is coupled back into the radar system by way of the coaxial cable segments 26 and 27 and the attenuator 29. In this manner, multiple signal reflections of successively decreasing amplitude are supplied back to the radar system. The amplitude of successive signal reflections decreases because of signal attenuation caused by the distributed resistive component of the transmission line 21 and because of the signal energy removed from the line 21 each time the signal passes the reactance coupler 28. In other words, the transmission line 21 is not a theoretically ideal transmission line and, hence, a signal suffers some attenuation as it is translated down the line. This transmission-line attenuation, which is normally considered undesirable, is utilized in the present invention to obtain the desired successive decreases in signal amplitude. Where the signal energy removed from the transmission line 21 by way of the reactive coupler 28 each time the signal passes the coupler 28 is relatively slight, as will be the usual case because the coupler 28 presents a relatively large impedance discontinuity, the decrease in amplitude between successive signal reflections may be considered as being caused primarily by the distributed attentuation of the transmission line 21.

Figure 3:
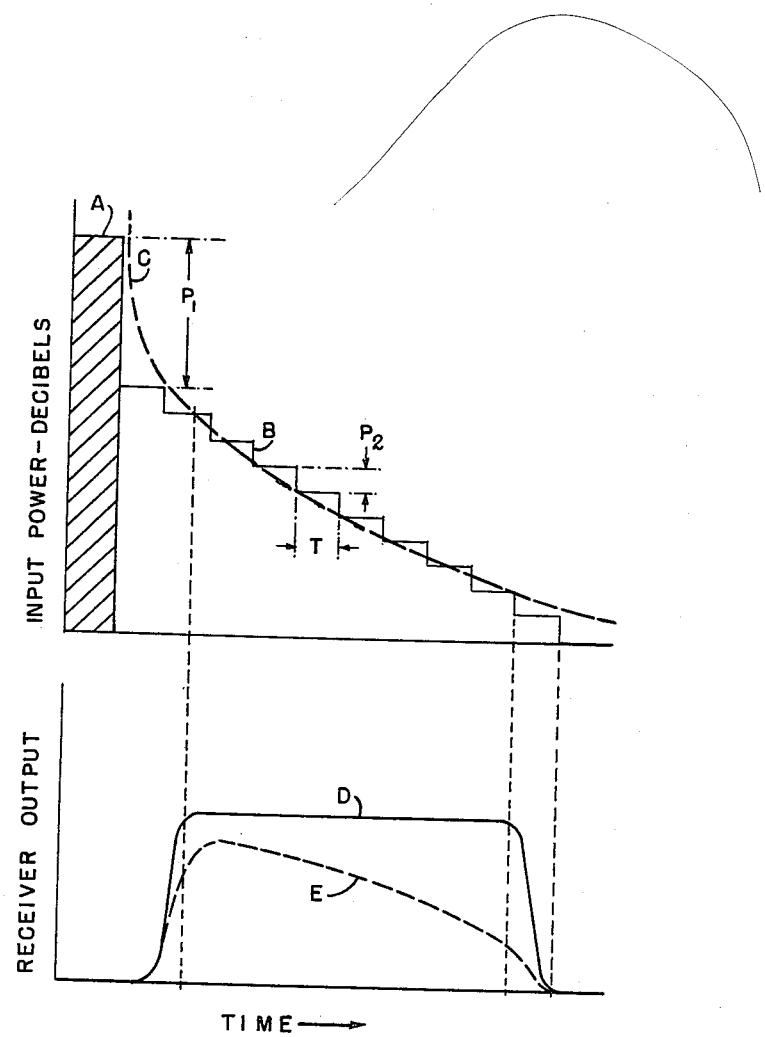
FIG. 3 is a graph representing signals developed at various points of the FIG. 1 system and used in explaining the operation thereof.

Referring now to FIG. 3 of the drawings, curve A, which is the boundary of the cross-hatched area, represents a radar pulse as developed by the transmitter 10 and supplied by way of the transmission line 11 to the testing apparatus 20. The multiple signal reflections of successively decreased amplitude which are developed by the testing apparatus 20 are represented by curve B of FIG. 3 which is in the nature of a staircase wave form. Curve B represents the multiple signal reflections at the output of the testing apparatus 20 or, in other words, at the coupler 25. It should be remembered that the transmitter 10 is transmitting periodic radar pulses only one of which is represented by curve A. Therefore, curve B represents the response of the testing apparatus 20 for only one cycle of a recurrent type operation. In other words, curve B is the response of the testing apparatus 20 to a single one of the periodic radar pulses, a corresponding response being produced by each of the other radar pulses developed by the transmitter 10.

The difference in power level of the first step of the multiple signal reflections represented by curve B from the power level of the input radar pulse represented by curve A, which difference is represented by the dimension $P_1$ of FIG. 3, is determined primarily by the attenuation of the attenuator 29, the reactance coupler 28, and the transmission line 21. More precisely, because each radar pulse must pass through the attenuator 29, the reactance coupler 28, and the entire length of the transmission line 21 twice before reappearing at the coupler 25 as a signal reflection, the decrease in power represented by $P_1$ is equal to twice the attenuation produced by these elements.

For multiple signal reflections as shown by curve B of FIG. 3, the time delay of the transmission line 21 is chosen so that the round-trip time for a radar pulse to travel to the far end of the line and back again is approximately equal to the duration of the radar pulse, such time being represented by the dimension T of the FIG. 3 curves. In this manner, a continously decreasing staircase wave form is produced. The difference in power level of successive steps of the staircase, as represented by the dimension $P_2$ of the drawings, is determined primarily by the round-trip attenuation of the transmission line 21. In other words, the only cause for difference in the amplitude of successive reflections is the attenuation produced by the transmission line 21. This attenuation is, of course, dependent on the type of transmission line utilized as well as the length thereof. In this manner, by properly selecting the type and length of transmission line a staircase wave form of desired duration and rate of decease may be developed.

The rate of decrease of the staircase wave form represented by cure B is a importance in testing the recovery characteristic of the units associated with the receiver of the radar system. This becomes apparent in connection with cure C of FIG. 3 which represents the power required at the coupler 13a of the radar system in order to produce a constant predetermined signal level at the output of the receiver 15. It will be noticed that the power required for this purpose decreases with time subsequent to transmission of the radar pulse represented by curve A. This, in effect, represents the composite effect of the recovery time required by the T.-R. box 14 and the receiver 15 subsequent to each radar pulse. A finite recovery time is required because each radar pulse causes the gaseous discharge tube associated with the T.-R. box 14 to become ionized and, hence, a finite time interval is required for the gaseous discharge tube to deionize subsequent to the production of the radar pulse. Also, it is common practice to afford further protection to the receiver 15 by gating the initial amplifier circuits thereof to a nonconductive condition during the occurrence of the radar pulse. A certain finite time is also required for these circuits to become conductive again subsequent to each radar pulse. Accordingly, as these circuits and the T.-R. box 14 recover their normal operating state for the reception of echo signals from distance targets, they become more sensitive and better able to translate the target echoes. Hence, less input power at coupler 13a is required to produce the desired constant predetermined signal level at the output of the receiver 15.

Curve D of FIG. 3 shows the wave form of the output signal produced at the output of the receiver 15 in response to the multiple signal reflections of the testing apparatus 20 where the average rate of decrease of the staircase wave form a curve B is designed to coincide with the desired rate of recovery of the receiver 15 circuits and the T.-R. box 15 after each radar pulse, provided such circuits and the T.-R. box 14 do recover at the desired rate. Thus, the existence of a more or less constant amplitude signal, as represented by curve D, at the output of the receiver indicates that the receiver circuits and the T.-R. box 14 are recovering at the desired rate. In practice, the top portion of the output signal represented by curve D will not be perfectly flat because of the staircase nature of the signal reflections from the testing apparatus 20 or, in other words, there may be a slight ripple along the top portion of this output signal. For simplicity of presentation, however, this signal is shown as having a relatively flat top. Also, the average amplitude of this output signal represented by curve D is indicative of whether the "loop sensitivity" of the radar system is of the proper value. In other words, where the amplitude of this output signal corresponds to a desired predetermined value, then it is known that the "loop sensitivity" of the radar system is also of the proper value. Accordingly, if this information is made available to a person checking the radar system, he may properly decide whether the system is operating properly.

There are several alternatives as to how the nature of the receiver 15 output signal may be presented to the person checking the radar system. In many applications the nature of the utilization device 16 is such that the presence or absence of the proper type receiver 15 output is indicated directly to the operator. For example, where the target echo signals are being displayed on an oscilloscope, then direct examination of the receiver output wave form on the oscilloscope display screen will enable the operator to determine the manner in which the radar system is performing. Another alternative is where the utilization device 16 comprises various relays and control circuits for controlling the operation of some further equipment associated with the radar system. In this case, proper operation of the radar system may be directly indicated by determining whether the relays associated with the utilization device 16 are operating properly. A third alternative, as illustrated in FIG. 1 of the drawings, is to utilize as separate peak detector 18 and meter 19 for developing a visual indication of the peak amplitude of the signal present at the receiver 15 output. By properly selecting the time constants of the components associated with the peak detector 18 and meter 19, the meter 19 may be made to give a desired predetermined indication only when both the recovery characteristic and the "loop sensitivity" of the radar system are of the desired value. Assume, for example, that the recovery characteristic of, say, the T.-R. box 14 should change due to either aging or else leakage of the gaseous discharge tube associated therewith. Then, the recovery curve for the T.-R. box 14 and receiver 15 does not fall as rapidly as the ideal curve represented by curve C of FIG. 3 and, hence, the signal present at the output of the receiver 15 for a single cycle of operation assumes a shape as represented, for example, by curve E of FIG. 3. This nature of output signal as represented by curve E would cause the meter 19 to read less than the desired value, hence indicating improper operation of the radar system.

As mentioned, the length of the transmission line 21 of the testing apparatus 20 should be selected so that the time required for an electrical signal to travel one way from one to the other end of the transmission line 21 is at least equal to one-half the duration of the radar pulse, which is the same thing as saying that the round-trip time relay of the transmission line 21 is at least equal to the duration of a single radar pulse. Where the transmission line 21 is of greater length than this minimum, there will be time intervals between successive steps in the signal reflections during which no signal energy is being supplied back to the radar system. Thus, instead of a staircase wave form, a series of pulses of successively decreasing amplitude would be produced. This type of signal is entirely suitable for testing the radar system provided the rate of decrease of the envelope of this series of pulses is properly adjusted so that this envelope decreases at the same rate at which the T.-R. box 14 and receiver 15 recover after a radar pulse. Of course, in order to keep the weight and size of the testing apparatus at a minimum, it will generally be desirable to use the shortest possible length of transmission line 21. The length of the transmission line 21, however, should not be made so short that the time required for a radar pulse to make a round trip down the transmission line 21 and back again is less than the duration of the radar pulse. If this should be permitted to occur, then phase addition and cancellation of the radio-frequency carrier signal forming the radar pulse will result in undesirable amplitude variations in the resulting signal supplied back to the radar system which may result in an improper evaluation of the operating performance of the radar system.

Also included in the testing apparatus 20 is the push termination assembly 30 for enabling the operator to suppress signal reflections within the transmission line 21 and thereby prevent any appreciable amount of reflected signal energy being supplied back to the radar system. A provision of this type is desirable because, of one thing, defective T.-R. boxes sometimes act like resonant circuits and, hence, "ring" or undergo self-oscillation in response to the radar pulses. This means that the T.-R. box itself would be developing and supplying signals to the receiver 15 subsequent to the transmission of a radar pulse which, of course, is undesirable. Thus, by disabling the testing apparatus 20 momentarily by way of the push termination assembly 30, the operator may check the meter 19. The presence of a meter reading under these circumstances would, for the example of a defective T.-R. box 14, indicate that the T.-R box 14 is undergoing self-oscillation and, hence, is defective.

It is thus apparent that radar testing apparatus constructed in accordance with the present invention represents a useful and reliable piece of test apparatus of relatively simple construction. All the operator need do is bring the testing apparatus, which may take the form as shown in FIG. 2 of the drawings, to the location of the radar equipment to be tested and then connect it to the radar system by way of a suitable connecting cable or coupler and then observe the reading on the meter 19. If the reading equals or exceeds the desired predetermined value, then the operator knows that the radar system is functioning properly. Otherwise, he is apprised of the fact that some part of the system is not operating properly. In this manner, a radar system may be quickly checked by a relatively unskilled person. In addition, it will be noted that the testing apparatus will furnish accurate and reliable indications over a long period of time without need for any adjustment of the apparatus. The performance of testing apparatus constructed in accordance with the present invention is highly stable because such performance is determined by stable circuit elements of a passive nature which are not readily susceptible to changes in temperatures, etc.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for testing the over-all performance of a radar system including a pulsed transmitter and a receiver, and especially for testing the recovery characteristic of the receiver subsequent to the moment when a radar pulse is transmitted, the apparatus comprising: a transmission line of length substantially greater than the operating wave length of the transmitter and responsive to a portion of each of the transmitted radar pulses for producing multiple signal reflections of successively decreasing amplitude which are supplied to the receiver for determining the operating condition thereof, the attenuation factor of the transmission line being such that the average rate of decrease in amplitude of the signal reflections produced by the line corresponds to the desired rate of recovery of the receiver after each radar pulse is transmitted; and means for coupling the transmission line to the radar system at a point common to both the transmitter and the receiver.

2. Apparatus for testing the over-all performance of a radar system including a pulsed transmitter and a receiver, and especially for testing the recovery characteristic of the receiver subsequent to the moment when a radar pulse is transmitted, the apparatus comprising: a transmission line of length substantially greater than the operating wave length of the transmitter and responsive to a portion of each of the transmitted radar pulses, the two ends of the transmission line being terminated in such a manner as to produce substantial impedance discontinuities thereat for enabling the portion of each of the transmitted radar pulses supplied to the transmission line to be reflected back and forth along the transmission line for producing multiple signal reflections of successively decreasing amplitude which are supplied to the receiver for determining the operating condition thereof, the attenuation factor of the transmission line being such that the average rate of decrease in amplitude of the signal reflections produced by the line corresponds to the desired rate of recovery of the receiver after each radar pulse is transmitted; and means for coupling the transmission line to the radar system at a point common to both the transmitter and the receiver.

References Cited in the file of this patent

UNITED STATES PATENTS

| | | |
|---|---|---|
| 2,217,957 | Lewis | Oct. 15, 1940 |
| 2,429,632 | Lair | Oct. 28, 1947 |
| 2,532,539 | Counter et al. | Dec. 5, 1950 |
| 2,549,131 | Rideout | Apr. 17, 1951 |
| 2,602,922 | Maynard | July 8, 1952 |
| 2,658,998 | Hyman | Nov. 10, 1953 |